(12) United States Patent
Sentmanat

(10) Patent No.: US 6,467,149 B2
(45) Date of Patent: Oct. 22, 2002

(54) APPARATUS FOR INJECTING MATERIALS INTO A COMPOSITE

(75) Inventor: Martin Lamar Sentmanat, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 76 days.

(21) Appl. No.: 09/732,056

(22) Filed: Dec. 7, 2000

(65) Prior Publication Data

US 2002/0069503 A1 Jun. 13, 2002

(51) Int. Cl.[7] .......................... B23P 19/00; A43D 61/00
(52) U.S. Cl. ................. 29/564.6; 29/564.8; 227/67; 227/80
(58) Field of Search .................... 29/33 R, 564.6, 29/564.8, 564.7; 227/152, 67, 69, 80, 79; 140/93 R; 112/200, 224

(56) References Cited

U.S. PATENT DOCUMENTS

| | | | | |
|---|---|---|---|---|
| 2,171,388 A | * | 8/1939 | Berger | 140/93 R |
| 4,215,807 A | * | 8/1980 | Ritter et al. | 227/152 |
| 4,506,818 A | * | 3/1985 | Ritter et al. | 227/67 |
| 4,628,846 A | * | 12/1986 | Vives | 112/420 |
| 5,167,360 A | * | 12/1992 | Ritter et al. | 227/69 |
| 5,186,776 A | * | 2/1993 | Boyce et al. | 112/475.01 |
| 5,350,615 A | * | 9/1994 | Darrieux | 112/412 |
| 5,515,798 A | * | 5/1996 | Cahuzac | 112/224 |
| 5,543,005 A | * | 8/1996 | Monget et al. | 112/412 |
| 5,598,617 A | * | 2/1997 | Ritter et al. | 227/69 |
| 5,642,679 A | * | 7/1997 | Monget et al. | 112/220 |

FOREIGN PATENT DOCUMENTS

| | | | | |
|---|---|---|---|---|
| JP | 1-285131 | * | 11/1989 | 29/33 R |
| JP | 404032896 A | * | 2/1992 | 29/564.8 |

* cited by examiner

*Primary Examiner*—William Briggs
(74) *Attorney, Agent, or Firm*—Nancy T. Krawczyk

(57) ABSTRACT

The invention relates to a method and apparatus for injecting material into a substrate. The apparatus 10 comprises a needle assembly having a needle 14, a movable central portion 26 and a substantially stationary top portion 26. The material to be injected 17 is threaded through apparatus 10 into needle 14, and is cut to the desired length by cutter 18. When needle 14 penetrates a substrate, an additional portion of material 17 is fed into the apparatus 10, and when needle 14 is removed from substrate 12, the additional material pushes into needle 14, forcing cut portion 16 to remain in the substrate. In the method of using the apparatus, additional steps for orienting the angle of the apparatus, and steps of controlling the concentration of the injected material in the substrate may be included.

7 Claims, 3 Drawing Sheets

APPARATUS FOR INJECTING MATERIALS INTO A COMPOSITE

FIELD OF THE INVENTION

The invention relates to a method and apparatus for incorporating reinforcement material into a substrate. Such reinforcement may be useful in plastic, polymeric and elastomeric products.

BACKGROUND OF THE INVENTION

Although there has been interest in the use of short fibers for reinforcing plastic and polymeric products for many years, the potential for such reinforcement has not been fully developed due to limitations in extrusion and mixing. Under existing processing, fibers are typically introduced into the compound as an ingredient during the mixing stage. However, such mixes are limited to short length fibers, low fiber loading and low compound viscosity because of the difficulties in processing due to the increase in compound viscosity caused by fiber incorporation. In addition, during compound mixing fibers tend to fracture and aggregate within the compound, producing pockets of poorly dispersed fibers within the compound matrix.

After mixing, fibers in a compound are generally randomly oriented. Attempts at achieving directionally oriented fibers in rubber components have been met with some, but not complete success. During extrusion and calendering, fibers in a compound tend to align in the direction of flow, although the random fiber orientation introduced during the mixing stage can never be entirely eliminated, due to the viscoelastic nature of the elastomer matrix. Thus, fiber orientation during processing can not be fully controlled, even by using highly aligning flow fields. As a consequence, complete, i.e. 100% fiber orientation cannot be achieved in the lengthwise direction of extruded or calendered components.

Although some degree of lengthwise fiber orientation can be achieved via extrusion and calendering processes, and lengthwise orientation has advantages in some applications, it is hypothesized that fibers oriented perpendicular to the surface, or in the thickness direction of a rubber component, can improve the abrasion and lateral stiffness properties of a component. However, such fiber composites cannot be produced by conventional processing operations. While very difficult to manufacture, attempts at achieving a perpendicular fiber orientation have been made by two methods. The first method is highly laborious and involves cutting sections of calendered or extruded fiber-filled components, where some degree of lengthwise fiber orientation is obtained, then rotating and plying sections of the calendered sheet side by side to provide perpendicular fiber orientation. A second method involves extruding a short-fiber reinforced compound through an abrupt expansion die that causes the extrudate sheet to fold upon itself in an accordion-like manner, so that a lamellar-type structure is obtained.

In order to perform fundamental studies in the effects that fiber composites have on properties such as abrasion and lateral stiffness, it is apparent that a new technology must first be developed that can obtain controlled fiber orientation and distribution within polymeric components.

An object of the invention is to develop a novel processing technology that will achieve precision orientation of fibers in polymeric components.

It is also an object of the invention to provide fiber reinforced composites with precisely placed and angled fiber reinforcement.

Other objects of the invention will be apparent from the following description and claims.

SUMMARY OF THE INVENTION

The invention relates to an apparatus 10 for injecting material into a substrate, the apparatus comprising a central portion 26 having a hole 30 therein for directing the path of material to be injected, a hollow needle 14 connected to a first end of central portion 26 for receiving material to be injected from central portion 26 and for penetrating a substrate, a cutter 18 associated with the apparatus 10 for separating material to be injected, a top 28 having a hole 32 associated with central portion 26 distal from the needle 14 for receiving material to be injected into apparatus 10, and clamping means 20, 22 disposed between top 28 and central portion 26 for controlling the status of the material to be injected with respect to the apparatus 10.

The first clamping means 22 is associated with top 28, and second clamping means 20 is associated with central portion 26, and central portion 26 is movable relative to top 28 and first clamping means 22. In the operation of the apparatus, the second clamping means 20 is in a locked position prior to separation of central portion 26 from top 28 and penetration of needle 14 into substrate 12, and first clamping means 22 is in an unlocked position. Also, the second clamping means 20 is in an unlocked position prior to separation of central portion 26 from top 28 and penetration of needle 14 into substrate 12, and first clamping means 22 is in a locked position.

A guard 24 provides a connection between central portion 26 and needle 14, and provides an end point or stop for the penetration of needle 14 into a substrate.

Also provided is a method for injecting a material into a substrate, the method comprising the steps of (a) providing a guide means such as a hollow needle 14 for a material to be injected, (b) directing a material to be injected into the guide means, (c) clamping the material to be injected in a stationary position relative to the guide means using a first clamping means 20 in a starting position, (d) cutting the material at a desired length, (e) inserting the guide means into a substrate to a second position, (f) releasing first clamping means 20 and engaging a second clamping means 22 to clamp the material to be injected in a stationary position independent of the guide means, (g) removing the guide means from the substrate and returning the guide means to a starting position. The cutting step (d) may take place before or after the material is injected into the substrate.

The method may comprise the further steps of using a fiber as the material to be injected, and selecting the substrate to be an elastomer.

DETAILED DESCRIPTION OF THE INVENTION

In the conception of the present invention, based on the belief of the inventors that precise orientation of reinforcement fibers, in a fiber reinforced product, would significantly improve such reinforcement, the inventors proposed to precisely inject fibers into a product. By injecting fibers into a product, it is believed that the orientation (angle) of the fiber and concentration of the fiber can be controlled and optimized for most beneficial and efficient use of the fiber reinforcement. For example, the fiber reinforcement may be placed to be more concentrated where most reinforcement is needed, and the fiber reinforcement may be precisely oriented (angled) to maximize the reinforcement.

Although the invention has application in any type of plastic or polymeric product, for ease of presentation, the invention will be illustrated as it applies to elastomer products, especially rubber products.

Also, it will be apparent to those skilled in the art that the apparatus of the invention can be used to inject a broad range of materials into a substrate, e.g. reinforcing polymer blends, high or low tack adhesives, fillers, etc. For ease of illustration, the invention will be described as it relates to the injection of fiber reinforcement into a rubber product. In the illustrated embodiment, monofilament or yarn fibers can be used.

Discrete fiber injection involves the injection of individual fibers into an uncured rubber matrix to achieve precision fiber orientation and distribution within a rubber component. The fibers are introduced into the rubber after the mixing and shaping stages of component processing, so discrete fiber injection technology is not limiting as to fiber size, fiber loading, or compound viscosity.

With reference now to FIGS. 1–4, an apparatus 10 which can be used in the method of the invention is illustrated in various stages of operation.

Figure 1:
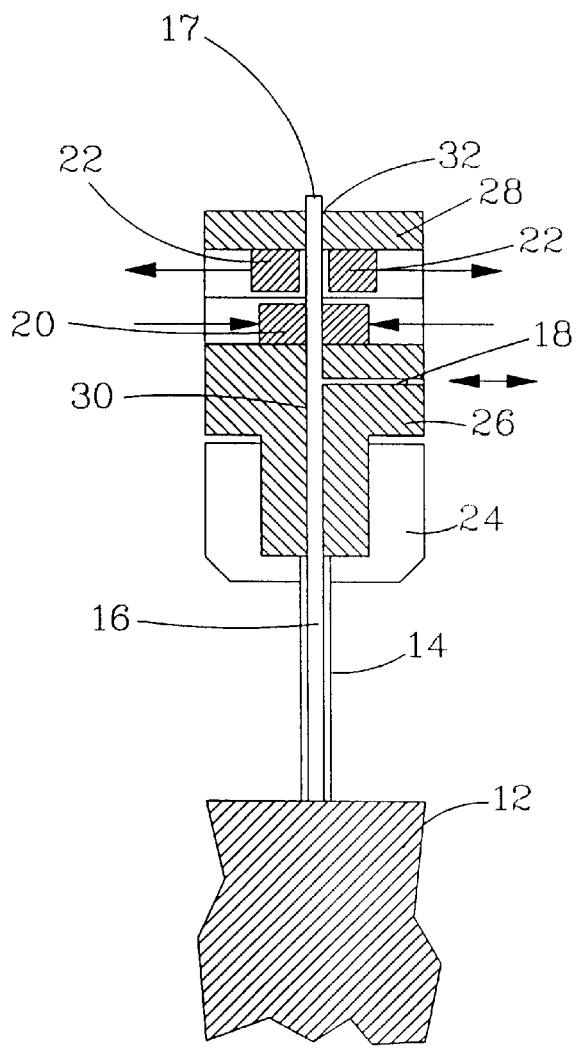
FIG. 1 illustrates apparatus of the invention in a start position for injecting material into a substrate.

With reference specifically to FIG. 1, the apparatus 10 of the invention comprises a needle assembly having a hollow needle 14 attached through guard 24 to a central portion 26. Central portion 26 has a cutter 18 associated therewith which is used to separate discrete lengths of a continuous fiber feed which enters the apparatus through hole 32 in top 28. Top 28 is separated from central portion 26 by grippers 20, 22 and, in the illustrated embodiment, is stationary, whereas central portion 26 is separable from, and capable of reciprocal motion relative to top 28.

In the development of the apparatus, it was found that placement of cutter 18 in central portion 26 was mechanically complicated. Although such an arrangement is workable, the inventors recognize the simplicity of placing a cutter in a position that makes possible cutting the injected material at the surface of the substrate. Such a location may be more suitable for some of the injected materials contemplated in the invention. Those skilled in the art will be able to place the cutter in the apparatus where it is most suitable for particular injectable materials and particular substrates.

Grippers 20, 22 can lock (close) on the fiber 16 to hold it stationary relative to the respective gripper, and can unlock (open) to release the fiber.

In a designed embodiment, the grippers are roller clutches that only turn in one direction. The roller clutches unlock when the material is pulled in the desired direction, and lock when forces tend to move the material in the opposite direction. Other types of gripping means will be apparent to those skilled in the art.

In the operation of needle assembly 10, a continuous fiber feed 17 is threaded into the fiber assembly through hole 32 in top 28, through grippers 20, 22 and through hole 30 in central portion 26 to hollow needle 14. In the illustrated embodiment, when the desired length of fiber 16 (for use as reinforcement in substrate 12) is threaded into needle assembly 10, cutter 18 is activated to separate fiber 16 from the continuous fiber feed 17. After cutting, the continuous fiber feed 17 continues to push into needle assembly 10, forcing the fiber 16 into hollow needle 14. When fiber 16 has been fed into hollow needle 14, lower gripper 20 clamps on continuous fiber feed 17.

As discussed above, a cutter may be positioned to separate fiber 16 at the surface of the substrate after it has been injected.

Figure 2:
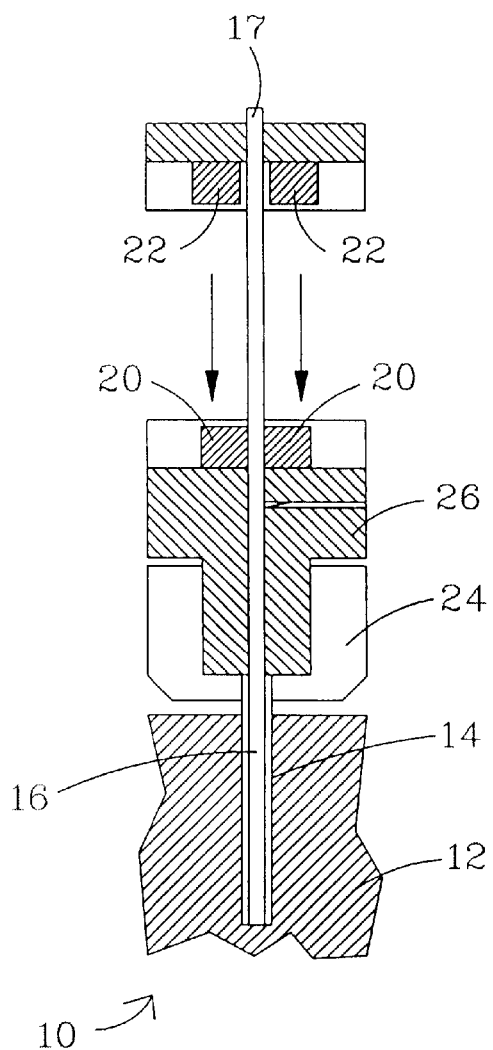
FIG. 2 illustrates apparatus of the invention injecting material into a substrate.

To inject fiber 16 into a substrate 12, central portion 26 of needle assembly 10 is pushed or driven in the direction of substrate 12, forcing needle 14 to penetrate substrate 12 as illustrated in FIG. 2. During this motion, lower gripper 20 remains locked, and upper gripper 22 remains unlocked, permitting the extraction of a precise length of fiber from continuous fiber feed 17 into needle assembly 10. The length of fiber extracted is equal to the length of the stroke of central portion 26 during penetration of needle 14 into substrate 12.

It is believed that the faster the injection takes place, the smaller will be the hole formed in the rubber substrate by the needle, because of the viscoelastic nature of rubber.

Guard 24, in addition to being the means of attaching needle 14 to the assembly, may act as a stop for the downward movement of central portion 26 toward substrate 12. That is, if the precise length of the down stroke of central portion 26 is not otherwise provided for, for example in gearing; guard 24 may rest against substrate 12 to stop penetration of needle 14 into substrate 12.

Figure 3:
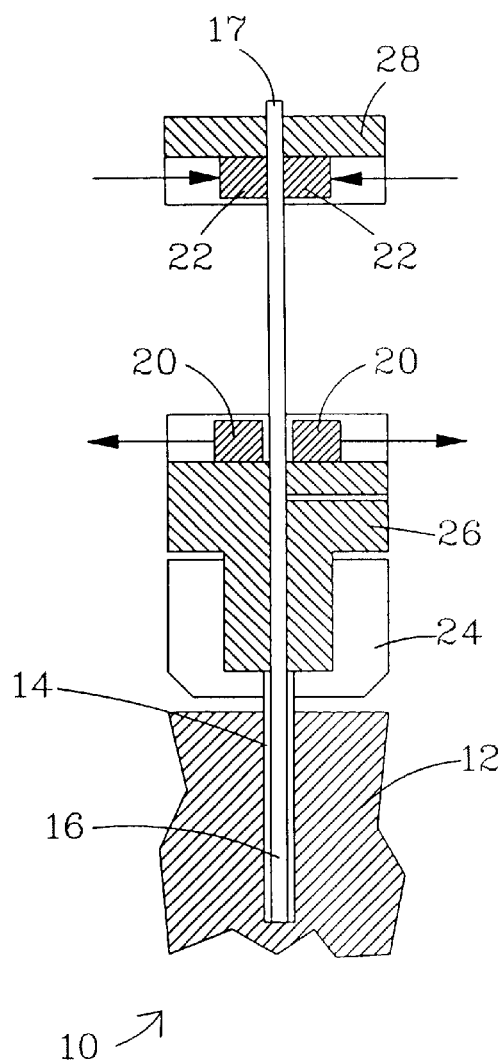
FIG. 3 illustrates apparatus of the invention positioned to withdraw from a substrate.
Figure 4:
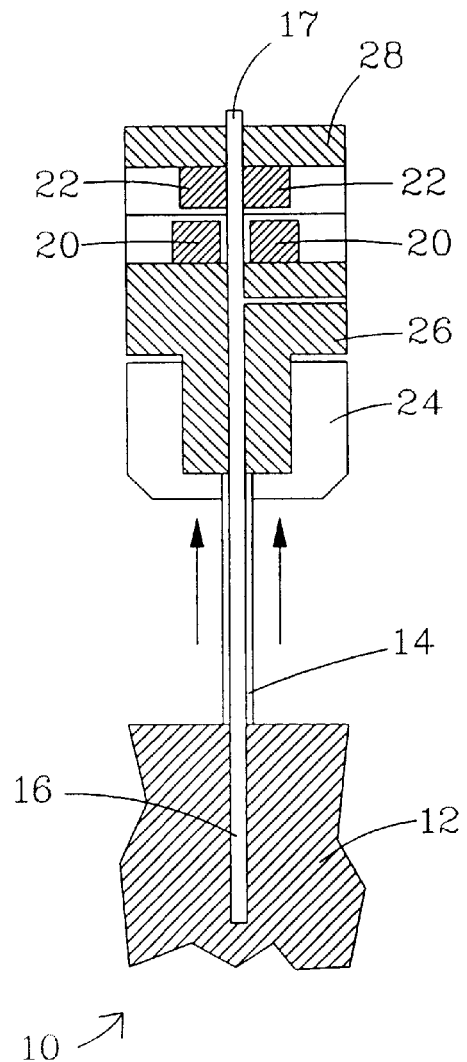
FIG. 4 illustrates apparatus of the invention after withdrawal from a substrate.

As illustrated in FIG. 3, before extraction of needle 14 from substrate 12, lower gripper 20 is unlocked, and upper gripper 22 is locked so that fiber 16 is released into substrate 12 when needle 14 is removed from substrate 12 as illustrated in FIG. 4. When needle 14 is removed from substrate 12, and lower grippers 20 are unlocked, and upper grippers 22 are locked, the continuous fiber feed 17 that has been extracted in the stroke of central portion 26, is forced into central portion 26 on its upward stroke. Thus, continuous fiber feed 17 pushes into central portion 26 and hollow needle 14 and prevents fiber 16 from withdrawing from substrate 12 when needle 14 is removed, and fiber 16 remains in substrate 12.

Following removal of needle 14 from substrate 12, as illustrated in FIG. 4, lower gripper 20 locks, upper gripper 22 unlocks, and cutter 18 is activated to cut a new length of fiber 16, and the apparatus is in position, as shown in FIG. 1, to carry out the process again.

The fiber may be coated with an RFL adhesive, or any other adhesive known to those skilled in the art, to enhance the bond between the fiber and the rubber when it is cured.

In the method of the invention, wherein apparatus 10 is used to inject a material into a substrate 12, the angle of orientation of apparatus 10, or the angle of orientation of substrate 12 is controlled so that the material (fiber 16 in the illustrated embodiment) is injected into the substrate at a specific, precise angle.

The choice of the angle of the injection is determined based on the kind of forces encountered by, and the kind of surface substrate 12 is expected to encounter when being used. For example, with reference to FIG. 5, if substrate 12 is the shoulder 52 of a tire tread 50 where abrasion resistance is needed, fibers 16 may be injected at an angle that will be normal (perpendicular) to the surface of the tread when the tire is cornering. To further illustrate, if substrate 12 is the central portion 54 of a tire tread 50, and traction on a smooth surface is desired, a high or low tack adhesive may be injected into a central portion of the tread at an angle which maximizes contact between the adhesive in a rotating tread and a road surface.

The method of the invention may be summarized in that when an apparatus 10 and a substrate 12 are properly oriented relative to each other, and the material to be injected is threaded into apparatus 10, needle 14 is injected into substrate 12, further material to be injected into substrate 12 is fed into apparatus 10 while material is being injected, and when needle 14 is removed from substrate 12, the newly fed material pushes the injected material out of needle 14, so that the injected material remains in substrate 12.

With reference to FIGS. 1–4, in the illustrated embodiment of the method, a continuous fiber is fed from a spool into a hollow needle injector assembly where the fiber is cut to length. A specific angle of penetration is chosen to maximize the benefit of the fiber reinforcement in the particular product in which it is used, and the cut-to-length fiber is then housed within the hollow needle shaft while the needle assembly is lowered to penetrate the elastomer matrix. As the needle is removed from the elastomer matrix, the cut fiber is deposited into the hole just evacuated by the needle. By controlling the injection angle of the needle assembly, the deposited fiber orientation is controlled.

The method is further illustrated with respect to specific products in copending application Ser. No. (Att. Doc no. id2000-354), filed on even date herewith.

The apparatus of the invention may be used as a single unit, or provided in banks where a plurality of units are placed side by side. When used in banks, each unit may apply a separate row of fibers where the fibers applied in each row can be the same as or different from the fibers in the other rows. Each unit may apply fibers at the same or at a different density in the rows, the same or different angles, and specific patterns of applied fibers may be provided as a result. The banks may be computer controlled to provide the patterns desired.

Figure 5:
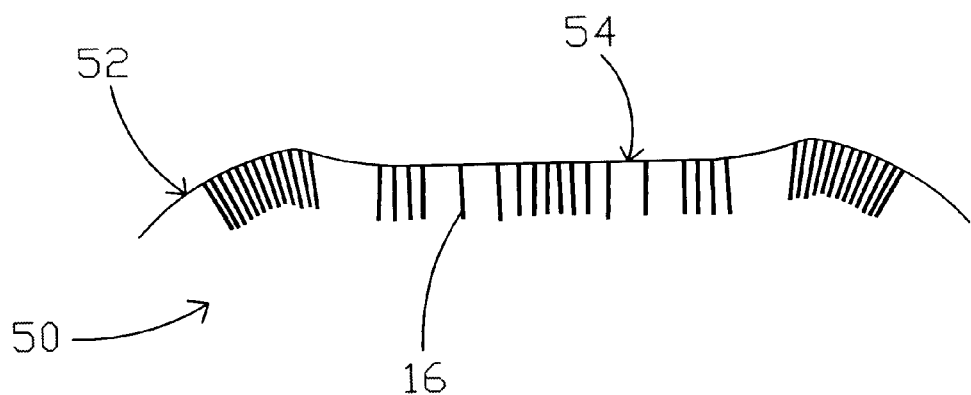
FIG. 5 illustrates a composite with precisely angled (oriented) and positioned fibers.

To use the tire tread of FIG. 5 as an example, a higher density of fibers 16 may be incorporated in shoulder 52 of tread 50 where more reinforcement and traction is needed due to stresses on the shoulder of the tire during cornering. Lower densities of fiber 16 are required in the center portion 54 of the tire where stresses and abrasion are less.

For most applications, it is believed that orientation of the fibers perpendicular to the surface of the tread is most beneficial, although it may be speculated, for increased traction, that fibers may be oriented in the center of a tread at an acute angle that is chosen so that the fibers bite into the pavement during acceleration of the tire.

Those skilled in the art will be able to determine suitable concentrations and orientations of injected reinforcement in other components of a tire, such as apexes, sidewalls, toe guards etc., and in other products, such as conveyer belts, based on the stresses and forces that act on the component or product, using the principles described herein.

While the invention has been specifically illustrated and described, those skilled in the art will recognize that the invention may be variously modified and practiced without departing from the spirit of the invention. The invention is limited only by the scope of the following claims.

What is claimed is:

1. An apparatus (10) for injecting material into a substrate comprising (a) a central portion (26) having a hole (30) therein for directing the path of material to be injected;

(b) a cutter (18) associated with said central portion (10) for separating material to be injected;

(c) a hollow needle (14) connected to a first end of the central portion (26) for receiving material to be injected from the central portion (26) and for penetrating a substrate;

(d) a top (28) having a hole (32) associated with the central portion (26) distal from said needle (14) for receiving material to be injected into apparatus (10), wherein said central portion (26) is movable relative to said top (28); and (e) clamping means (20, 22) disposed between the top (28) and the central portion (26) for controlling the status of the material to be injected with respect to the apparatus (10).

2. The apparatus of claim 1 wherein first clamping means (22) is associated with the top (28) and the second clamping means (20) is associated with the central portion (26), and the central portion (26) is movable relative to the top (28) and the first clamping means (22).

3. The apparatus of claim 2 further comprising a guard (24) for providing connection between the central portion (26) and the needle (14) and for providing an end point or stop for the penetration of the needle (14) into a substrate.

4. The apparatus of claim 2 wherein the second clamping means (20) has locking means such that the second clamping means (20) is in a locked position prior to separation of the central portion (26) from the top (28) and penetration of the needle (14) into the substrate (12), and when the first clamping means (22) is in an unlocked position.

5. The apparatus of claim 2 wherein the second clamping means (20) has locking means such that the second clamping means (20) is in an unlocked position prior to separation of the central portion (26) from the top (28) and penetration of the needle (14) into substrate (12), and when the first clamping means (22) is in a locked position.

6. The apparatus of claim 2 wherein the cutter (18) operates to cut the material to be injected prior to separation of the central portion (26) from the top (28).

7. An apparatus (10) for injecting material into a substrate comprising (a) a central portion (26) having a hole (30) therein for directing the path of material to be injected;

(b) a cutter (18) associated with said central portion (10) for separating material into discrete lengths prior to insertion of the material into the substrate;

(c) a hollow needle (14) connected to a first end of the central portion (26) for receiving material to be injected from the central portion (26) and for penetrating a substrate;

(d) a top (28) having a hole (32) associated with the central portion (26) distal from said needle (14) for receiving material to be injected into apparatus (10), wherein said central portion (26) is movable relative to said top (28); and (e) clamping means (20, 22) disposed between the top (28) and the central portion (26) for controlling the status of the material to be injected with respect to the apparatus (10).

* * * * *